(12) United States Patent
Wada

(10) Patent No.: US 7,015,922 B2
(45) Date of Patent: Mar. 21, 2006

(54) IMAGE DISPLAY METHOD AND PORTABLE TERMINAL FOR DISPLAYING SELECTED IMAGE

(75) Inventor: Akihiko Wada, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 201 days.

(21) Appl. No.: 09/980,739

(22) PCT Filed: Feb. 22, 2001

(86) PCT No.: PCT/JP01/01314

§ 371 (c)(1),
(2), (4) Date: Mar. 14, 2002

(87) PCT Pub. No.: WO01/63388

PCT Pub. Date: Aug. 30, 2001

(65) Prior Publication Data

US 2003/0011608 A1    Jan. 16, 2003

(30) Foreign Application Priority Data

Feb. 24, 2000  (JP)  ............ P.2000-047505

(51) Int. Cl.
   *G09G 5/00*     (2006.01)
   *G06F 15/00*    (2006.01)
(52) U.S. Cl. .................. 345/581; 715/500
(58) Field of Classification Search ........ 345/581, 345/619; 715/500, 526, 515, 527, 517
See application file for complete search history.

(56) References Cited

U.S. PATENT DOCUMENTS

| | | | | |
|---|---|---|---|---|
| 4,808,987 A | * | 2/1989 | Takeda et al. ............ 345/667 |
| 4,924,426 A | * | 5/1990 | Kameda et al. ........... 711/100 |
| 5,237,312 A | * | 8/1993 | Akiyama et al. ........... 345/10 |
| 5,363,504 A | * | 11/1994 | Hasuo .................. 707/104.1 |
| 5,533,186 A | * | 7/1996 | Tanahashi et al. ......... 345/549 |
| 5,539,427 A | * | 7/1996 | Bricklin et al. ........... 345/622 |
| 5,714,972 A | * | 2/1998 | Tanaka et al. ............ 345/156 |
| 5,717,940 A | * | 2/1998 | Peairs ................... 715/515 |
| 5,903,904 A | * | 5/1999 | Peairs ................... 715/526 |
| 6,002,798 A | * | 12/1999 | Palmer et al. ............ 382/176 |
| 6,067,554 A | * | 5/2000 | Hohensee et al. ......... 715/527 |
| 6,069,618 A | * | 5/2000 | Ogo .................... 345/173 |
| 6,147,670 A | * | 11/2000 | Rossmann ............... 345/685 |
| 6,182,090 B1 | * | 1/2001 | Peairs ................... 715/500 |
| 6,209,009 B1 | * | 3/2001 | Schwartz et al. .......... 715/517 |
| 6,263,121 B1 | * | 7/2001 | Melen et al. ............. 382/305 |
| 6,307,573 B1 | * | 10/2001 | Barros .................. 715/764 |
| 6,320,595 B1 | * | 11/2001 | Simons et al. ............ 345/619 |
| 6,414,679 B1 | * | 7/2002 | Miodonski et al. ........ 345/420 |
| 6,445,396 B1 | * | 9/2002 | Suzuki .................. 345/636 |

(Continued)

FOREIGN PATENT DOCUMENTS

EP       0750271      * 12/1996

(Continued)

*Primary Examiner*—Ryan Yang
(74) *Attorney, Agent, or Firm*—Pearne & Gordon LLP

(57) ABSTRACT

An image display method for displaying description data having text information and image information described in a predetermined description format. The image display method comprises the steps of extracting attribute values indicating attributes for specifying the image information from the description data (106), listing the extracted attribute values (108, 109), selecting at least one attribute value from among the listed attribute values (111), reading the image information specified by the selected attribute value (112), and displaying the image information (113).

15 Claims, 3 Drawing Sheets

```
DESCRIPTION FILE
    ⋮
IMG SRC = "IMAGE FILE 1"  ALT = "CHARACTER STRING 1"
IMG SRC = "IMAGE FILE 2"  ALT = " "
IMG SRC = "IMAGE FILE 3"  ALT = "CHARACTER STRING 3"
IMG SRC = "IMAGE FILE 4"  ALT = "CHARACTER STRING 4"
    ⋮
```

U.S. PATENT DOCUMENTS

| | | | |
|---|---|---|---|
| 6,456,307 B1 * | 9/2002 | Bates et al. | 345/838 |
| 6,456,738 B1 * | 9/2002 | Tsukasa | 382/175 |
| 6,483,510 B1 * | 11/2002 | Jeong | 345/467 |
| 6,504,540 B1 * | 1/2003 | Nakatsuka | 345/619 |
| 6,583,799 B1 * | 6/2003 | Manolis et al. | 715/838 |
| 6,592,045 B1 * | 7/2003 | Tatsuta | 235/494 |
| 6,606,094 B1 * | 8/2003 | Jones, Jr. | 345/467 |
| 6,690,492 B1 * | 2/2004 | Nakajima | 358/462 |
| 2002/0067365 A1 * | 6/2002 | Suzuki | 345/619 |

FOREIGN PATENT DOCUMENTS

| | | |
|---|---|---|
| EP | 949 571 A2 | 10/1999 |
| EP | 949 571 A3 | 10/1999 |
| EP | 967 556 A2 | 12/1999 |

* cited by examiner

FIG. 2

```
DESCRIPTION FILE
          ⋮

IMG SRC = "IMAGE FILE 1"  ALT = "CHARACTER STRING 1"
IMG SRC = "IMAGE FILE 2"  ALT = " "
IMG SRC = "IMAGE FILE 3"  ALT = "CHARACTER STRING 3"
IMG SRC = "IMAGE FILE 4"  ALT = "CHARACTER STRING 4"
          ⋮
```

FIG. 3

```
IMAGE SELECTION LIST

1   CHARACTER STRING 1
2   IMAGE FILE 2
3   CHARACTER STRING 3
4   CHARACTER STRING 4
```

IMAGE DISPLAY METHOD AND PORTABLE TERMINAL FOR DISPLAYING SELECTED IMAGE

This application claims the benefit of International Application Number PCT/JP01/01314, which was published in English on Aug. 30, 2001.

TECHNICAL FIELD

This invention relates to display of description data of a web page specified with a URL (Uniform Resource Locator) and in particular to an image selection and display method for selecting and displaying any desired image as required and a portable terminal for displaying an image using the method.

BACKGROUND ART

In recent years, the following service has been known: A WWW (World Wide Web) browser function is installed in a portable telephone for viewing various pieces of information described in a format of HTML (HyperText Markup Language), etc., existing in WWW servers. The data handled in WWW includes not only text, but also inline images linked in web pages and displayed inline by the WWW browser. Each web page made up of such data assumes that it is displayed by a standard WWW browser installed in a PC (personal computer), and contains a large amount of text and image data.

On the other hand, a simplified browser those function is limited is installed in a portable telephone and memory and physical screen limits are involved in the portable telephone and therefore it is difficult to provide a display form similar to that using a PC. Thus, to display a web page on a portable telephone, an image is not displayed or if an image is displayed, the display area is reduced for displaying the image (scaled-down display) or a part of the image is displayed (partial display), so that the viewability of text information displayed on the screen of the portable telephone is not impaired.

However, even with portable telephones, the demand for aggressively displaying a web page image is strong; in this case, how the image can be displayed efficiently without sacrificing text information, etc., on the limited screen is essential Further, with a terminal capable of displaying a color image, importance of images is high and it is desired that image information should be effectively displayed and utilized like text information.

DISCLOSURE OF INVENTION

It is therefore an object of the invention to provide an image display method for enabling the user to display any desired image as required. It is also an object of the invention to provide a portable terminal capable of displaying an image effectively even if the portable terminal is a portable terminal such as a portable telephone having a physically limited screen size.

According to first aspect of the invention, there is provided an image display method for displaying description data having text information and image information described in a predetermined description format, the image display method comprising the steps of extracting attribute values indicating attributes for specifying the image information from the description data, listing the extracted attribute values, selecting at least one attribute value from among the listed attribute values, and reading and displaying the image information specified by the selected attribute value.

The attribute values indicating the attributes for specifying the image data forming the description data are listed, any desired attribute value is selected from among the listed attribute values, and the image corresponding to the selected attribute value is displayed, so that the user can selectively display any desired image as required.

In the image display method, preferably, the step of listing the extracted attribute values lists alternative character strings to images inline displayed in the description data.

The alternative character strings to the images (indicating the image contents) are listed, whereby the image contents can be recognized by referencing the listing.

In the image display method, preferably, the step of listing the extracted attribute values lists file names indicating the locations of usages inline displayed in the description data.

The file names indicating the locations of the images are listed, whereby when listing the alternative character strings is not adequate or is impossible, the locations of the images can also be recognized.

The image display method, preferably, further comprises the steps of selecting a format of images inline displayed in the description data based on the attribute values and listing images in the selected file format.

The attribute values can be referenced for determining the image format, so that any desired image can be selected and displayed from among still images, moving images, etc.

According to second aspect of the invention, a portable terminal comprising a display section for displaying description data having text information and image information described in a predetermined description format, and image selection and display means for extracting attribute values indicating attributes for specifying the image information from the description data, listing the extracted attribute values, selecting at least one attribute value from among the listed attribute values, reading the image information specified by the selected attribute value, and displaying the image information on the display section.

The attribute values indicating the attributes for specifying the image data forming the description data are listed, any desired attribute value is selected from among the listed attribute values, and the image corresponding to the selected attribute value is displayed on the display section of the portable terminal, whereby it is made possible to separate text and an image for display. Thus, even with a terminal having a limited screen size, an image can be displayed effectively without impairing text information.

In the portable terminal, preferably, the attribute values are alternative character strings to images inline displayed in the description data.

The alternative character strings to the images (indicating the image contents) are listed, whereby the image contents can be recognized by referencing the listing and any desired image can be selected and displayed on the display section of the portable terminal.

In the portable terminal, preferably, the attribute values are file names indicating the locations of images inline displayed in the description data.

The file names indicating the locations of the images are listed, whereby when listing the alternative character strings is not adequate or is impossible, the locations of the images can also be recognized and any desired image can be selected and displayed on the display section of the portable terminal In the portable terminal, preferably, further a format of images inline displayed in the description data is selected based on the attribute values, images in the selected file format are listed, and an image in any desired format is displayed on the display section.

The attribute values can be referenced for determining the image format, so that any desired image can be selected from among still images, moving images, etc., and can be displayed on the display section of the portable terminal.

BRIEF DESCRIPTION OF DRAWINGS

In the accompanying drawings:

FIG. 2 is a drawing to show description files describing web pages;

FIG. 3 is a drawing to show an image selection list for selecting an image out of description data.

BEST MODE FOR CARRYING OUT THE INVENTION

Image data related to image display of the invention will be discussed, followed by a description of an embodiment of the invention. A WWW browser for displaying a web page accesses the WWW server specified with a URL through the Internet or an intranet in a WWW service client, reads the description data of a web page described in a predetermined format such as HTML in page units, and processes the data for display, then displays the contents of the web page on a screen.

To display an image on a web page in HTML, the image attribute is described in the place where the image is to be linked in the description data of the web page in the following format using an inline image tag IMG:

<IMG SRC="URL of image file" ALT="alternative character string">

In the image description with the image tag IMG, the description with SRC is called SRC attribute, the description with ALT is called ALT attribute, and "URL of image file" and "alternative character string" are called attribute values. The SRC attribute specifies the URL (location) of the image file in which the image data to be displayed is stored. The URL of the image file is made up of a file name indicating the location of the image file and an extension indicating the format of the file. The ALT attribute enables alternative display of an image to show the image contents in a WWW browser incapable of displaying an image or a WWW browser wherein image display is limited. The alternative character string is represented so that the image contents can be identified without recognizing the image.

In the current HTML, the IMG element for specifying an inline image comprises attributes representing the image display position, etc., as well as the SRC attribute and the ALT attribute; further various attributes can also be supported as the HTML function is extended. Therefore, it is to be understood by those skilled in the art that as attributes are added, the attributes are listed and an image is selected.

Referring now to the accompanying drawings, there is shown a preferred embodiment of the invention.

Figure 1:
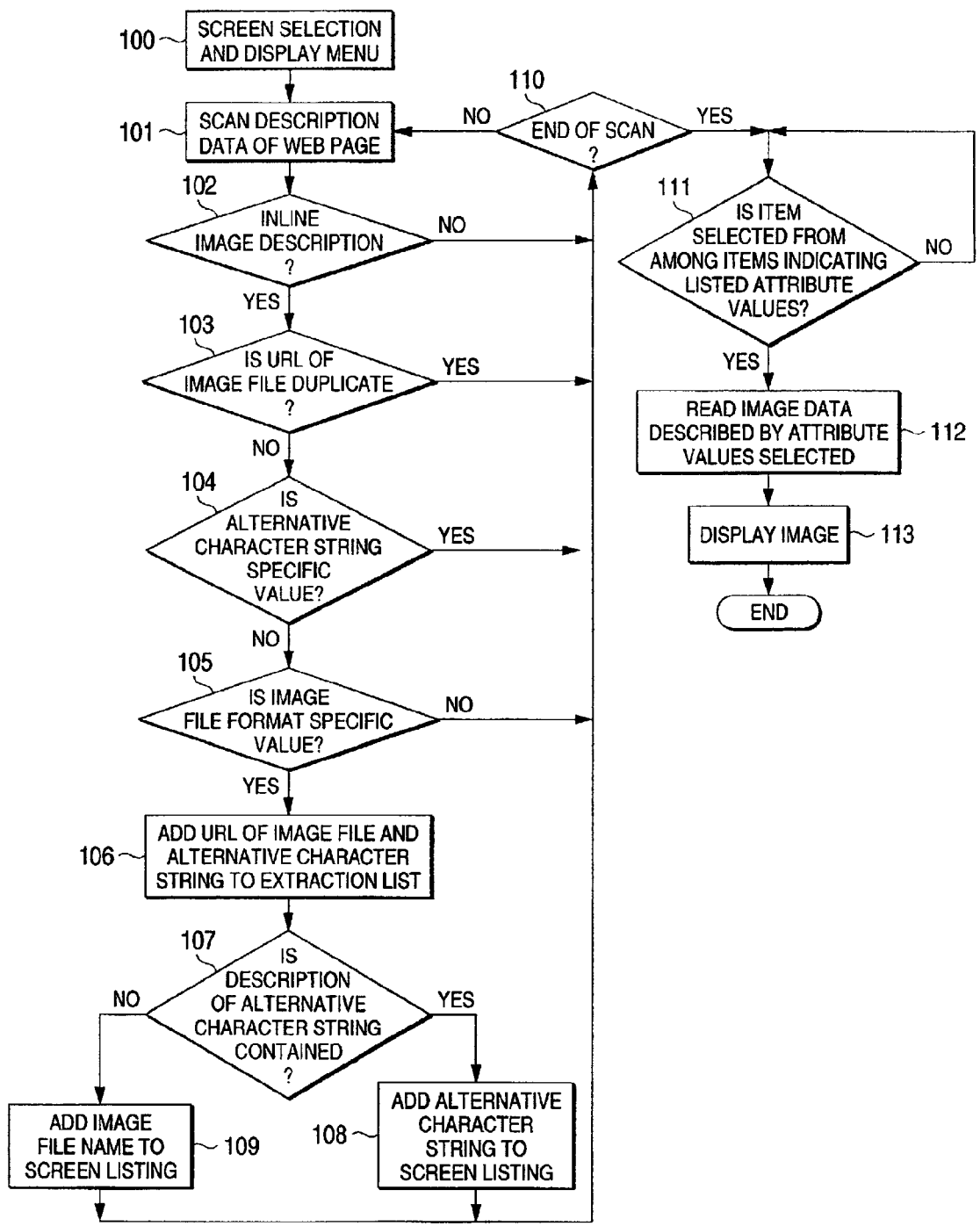
FIG. 1 is a flowchart of an image selection and display method according to an embodiment of the invention.

FIG. 1 is a flowchart of an image display method to show an embodiment of the invention. Steps 101 to 113 shown in FIG. 1 indicate an image selection and display method executed when an image selection and display menu function (image selection and display means) 100 installed in a portable machine is started.

In FIG. 1, at step 101, the description data of a web page read by a WWW browser is scanned and at step 102, whether or not the description data is inline image description is determined. The description data is determined inline image description by detecting an inline image tag IMG in HTML description data. If the description data is determined inline image description, attribute description forming the inline image tag, namely, an SRC attribute (SRC="URL of image file") and an ALT attribute (ALT="alternative character string") are extracted and steps 103 to 109 are executed.

At step 103, if the same image is described repeatedly in the description data of the web page, "URL of image file" is compared and processing is skipped for already extracted image description, whereby duplicate extraction of listed attributes values can be avoided.

At step 104, if the attribute value of the ALT attribute is set to a specific value, such as an asterisk (*), for an image not necessarily important, the "alternative character string" is compared with a specific value, whereby the image description can be placed out of the listing. For example, to describe a hyperlink using an anchor tag, an image may be used as simple display.

At step 105, if the file format of the image file name described in the SRC attribute indicates a specific file format, it is determined that the image description is to be placed in the listing; if the file format indicates any other file format, it is determined that the image description is to be placed out of the listing. In the image formats of images described on web pages, the images that can be displayed on the current portable telephones are limited to still images only in a file format gif because of terminal hardware and software restrictions. The gif format is specified as the specific file format, whereby only images fitted to image display can be selected.

If it is determined through the steps that the image description is to be placed in the listing, control goes to step S106 and the SRC attribute and the ALT attribute of the image description are extracted and are written into an extraction list. The format and description of the extraction list may be arbitrary in response to the whole processing; the extraction list is used for duplicate detection of the attribute values at step 103 and processing for reading the image selected at step 112.

At step 107, whether or not the extracted image description contains the ALT attribute, namely, description of "alternative character string" is determined. If it contains description of "alternative character string," control goes to step 108 and the alternative character string is added to listing on a screen (see FIG. 2). If the extracted image description does not contain description of "alternative character string," control goes to step 109 and the "image file name" described in the SRC attribute is added to listing on a screen (see FIG. 2).

Figure 4:
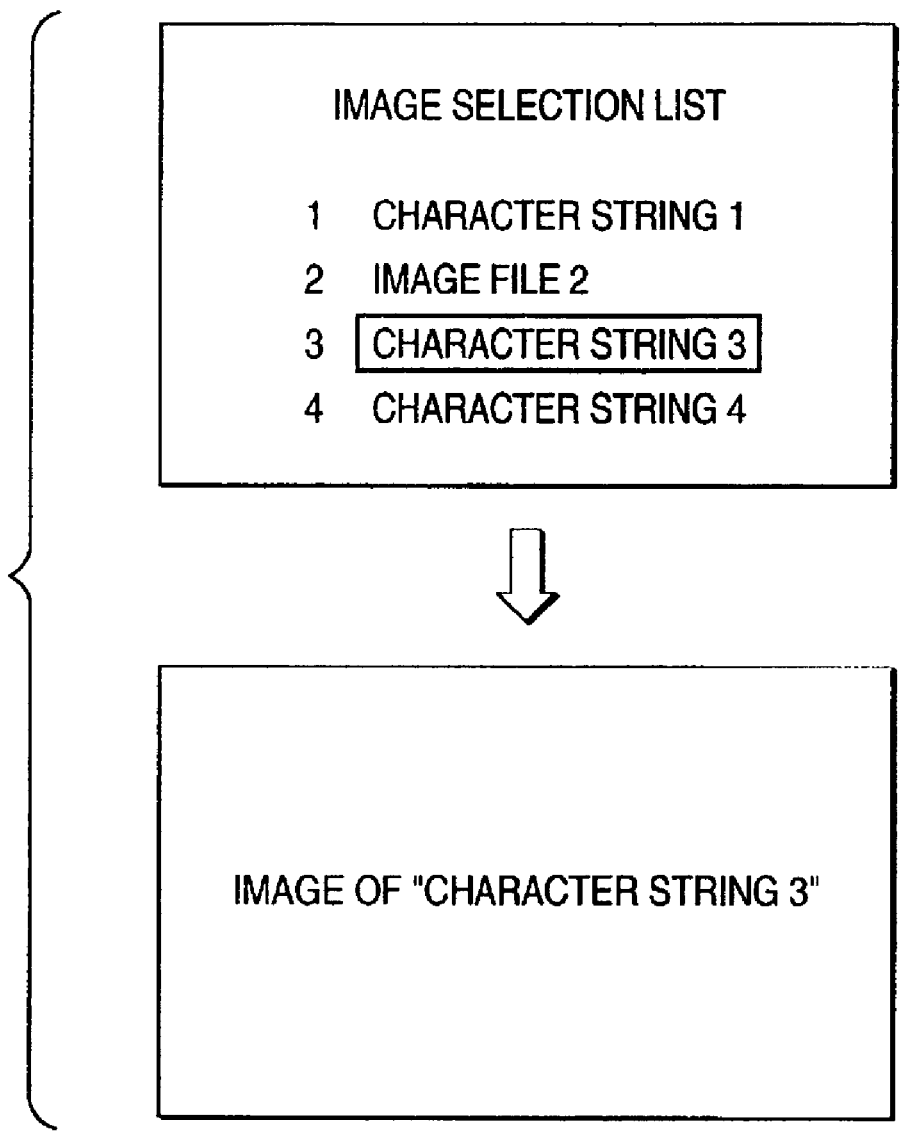
FIG. 4 is a drawing to show how the image selected out of the image selection list is displayed on a display section of a portable terminal.

When it is determined at step 110 that web page scanning terminates, all attribute values of the image descriptions extracted are listed on the screen (see FIG. 3). At step 111, the user of the portable terminal such as a portable telephone selects an arbitrary item from among the items indicating the attribute values of the images listed, and selects the image to be displayed. When one item is selected from among the listed items, control goes to step 112 and the information written into the extraction list is referenced for the image described by the attribute values of the selected item and the image data is read. At step 113, an image is drawn using the image data and is displayed on the full screen. FIG. 4 shows a case wherein "CHARACTER STRING 3" is selected out of the image selection list shown in FIG. 3 and the image of "CHARACTER STRING 3" is displayed on the screen.

When a web page is read, if text data and image data are read in batch and are stored in memory installed in the portable telephone, the memory is referenced and image is input. On the other hand, if image data of a web page is skipped and only text data is stored in memory installed in the portable telephone, the WWW server is referenced and image is input. One image corresponding to one item written into the extraction list is displayed on a full screen and in addition, two or more items may be selected out of the extraction list and two or more images corresponding to the two or more items may be displayed in split areas of the screen.

In the processing of the embodiment described above, the image files whose file format is gif are selected. However, as the performance of a display screen of a portable terminal is enhanced continuously and the internal memory capacity is extended constantly, there is a possibility that it till be made possible to also display a still image in any other file format. A technique of displaying images in the gif format one after another, thereby showing motion like an animation is available at present; there is a possibility that it will be made possible to also display a moving image in any other format described on a web page in the near term.

In such a case, a function of specifying an image file format may be provided for selecting the type of image to be displayed. For example, the following processing is possible: A menu function is provided with a file specifying menu and is set so as to extract moving image description in a specific format from description files of web pages using the file specifying menu and the attribute values are listed on a screen.

In the embodiment described above, the portable telephone is taken as an example of the portable terminal, but the invention can also be applied to an information terminal with a small image display area. Even to a terminal with an unlimited screen size, to separate text information and image information for display as required, for example, to display text information taking precedence over image information, the invention can also be applied.

INDUSTRIAL APPLICABILITY

As described above, according to the image display method, the attribute values indicating the attributes for specifying the image data forming the description data are listed, any desired attribute value is selected from among the listed attribute values, and the image corresponding to the selected attribute value is displayed, so that the user can selectively display any desired image as required.

According to the portable terminal, the attribute values indicating the attributes for specifying the image data forming the description data are listed, any desired attribute value is selected from among the listed attribute values, and the image corresponding to the selected attribute value is displayed on the display section of the portable terminal, whereby it is made possible to separate text and an image for display. Thus, even with a terminal having a limited screen size, an image can be displayed effectively without impairing text information.

The invention claimed is:

1. An image display method for displaying description data including predefined attributes each having text information and image information as an attribute value described in a predetermined description format, said image display method comprising the steps of:
    extracting said attribute values from the description data;
    listing the text information of the extracted attribute values as alternative character strings to images inline displayed in the description data;
    selecting at least one attribute value from among the listed attribute values; and
    reading and displaying the image information specified by the selected attribute value.

2. The image display method as claimed in claim 1 wherein said step of listing the extracted attribute values lists file names indicating locations of images inline displayed in the description data.

3. The image display method as claimed in claim 2 further comprising the steps of selecting a format of images inline displayed in the description data based on the attribute values and listing images in the selected file format.

4. A portable terminal comprising:
    a display section for displaying description data including predefined attributes each having text information and image information as an attribute value described in a predetermined description format;
    image selection and display means for extracting said attribute values from the description data and listing the text information of the extracted attribute values as alternative character strings to images inline displayed in the description data, and for selecting at least one attribute value from among the listed attribute values, reading the image information specified by the selected attribute value, and displaying the image information on the display section.

5. The portable terminal as claimed in claim 4 wherein the attribute values are file names indicating locations of images inline displayed in the description data.

6. The portable terminal as claimed in claim 5 wherein further a format of images inline displayed in the description data is selected based on the attribute values, images in the selected file format are listed, and an image in any desired format is displayed on the display section.

7. A display method for displaying a representation of a document on a portable display, said document having one or more images, wherein the document is described in a data file using a predetermined description language including predefined attributes each having values of text information about one of the one or more images, said display method comprising the steps of:
    extracting, from the data file, the corresponding attribute values of text information for each of the one or more images;
    listing the corresponding attribute values of text information on the display as alternatives to inline images displayed in the description data;
    selecting at least one of the listed attribute values; and
    displaying, on the portable display, image information about the image corresponding to the selected attribute value.

8. The method of claim 7, wherein said image information includes a graphical representation of the image.

9. The method of claim 7, wherein said image information includes information about a file of the image.

10. The method of claim 7, wherein said image information includes an indication as to whether the image can be displayed.

11. A method of displaying, on a portable display, a web page described by one or more data files, said web page having one or more images, said method comprising the steps of:
- extracting, from the one or more data files, corresponding attribute values including textual information for each of the one or more images;
- listing the corresponding attribute values on the portable display as alternatives to inline images displayed in the description data;
- allowing a user to select one of the listed attribute values; and
- displaying, on the portable display, image information about the image corresponding to the selected attribute value, wherein said image information includes a non-graphical representation of the image.

12. The method of claim 11, wherein said non-graphical representation of the image includes a textual description of the image.

13. The method of claim 11, wherein said non-graphical representation of the image includes information about a file of the image.

14. The method of claim 11, wherein said image information further includes a graphical representation of the image.

15. The method of claim 11, wherein said non-graphical representation of the image includes an indication as to whether the image can be displayed by the portable display.

* * * * *

UNITED STATES PATENT AND TRADEMARK OFFICE
CERTIFICATE OF CORRECTION

PATENT NO. : 7,015,922 B2
APPLICATION NO. : 09/980739
DATED : March 21, 2006
INVENTOR(S) : Akihiko Wada It is certified that error appears in the above-identified patent and that said Letters Patent is hereby corrected as shown below:

Column 1, line 31 change "those" to --whose--

Column 2, line 18 change "usages" to --images--

Column 5, line 23 change "till" to --will--

Signed and Sealed this

Twenty-sixth Day of September, 2006

JON W. DUDAS
*Director of the United States Patent and Trademark Office*